United States Patent
Zimmer et al.

(10) Patent No.: US 7,082,527 B2
(45) Date of Patent: Jul. 25, 2006

(54) METHOD AND SYSTEM FOR RAPID REPURPOSING OF MACHINES IN A CLUSTERED, SCALE-OUT ENVIRONMENT

(75) Inventors: Vincent J. Zimmer, Federal Way, WA (US); Michael A. Rothman, Gig Harbor, WA (US); Shaofan Li, Shanghai (CN); Andrew J. Fish, Gig Harbor, WA (US); Mark S. Doran, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 443 days.

(21) Appl. No.: 10/459,778

(22) Filed: Jun. 11, 2003

(65) Prior Publication Data

US 2004/0255110 A1    Dec. 16, 2004

(51) Int. Cl.
G06F 9/445 (2006.01)
G06F 9/24 (2006.01)
G06F 15/16 (2006.01)

(52) U.S. Cl. .............. 713/2; 713/1; 709/232
(58) Field of Classification Search .......... 713/1, 713/2; 709/232, 231, 222
See application file for complete search history.

(56) References Cited

U.S. PATENT DOCUMENTS

| 5,584,326 | A * | 12/1996 | Galli ................... 141/83 |
| 5,761,380 | A * | 6/1998 | Lewis et al. ............ 706/47 |
| 6,144,992 | A * | 11/2000 | Turpin et al. ........... 709/208 |
| 6,263,378 | B1 * | 7/2001 | Rudoff et al. .......... 719/327 |
| 6,317,826 | B1 * | 11/2001 | McCall et al. ........... 713/1 |
| 6,421,777 | B1 * | 7/2002 | Pierre-Louis et al. ..... 713/2 |
| 6,643,772 | B1 * | 11/2003 | Aguilar et al. ........... 713/2 |
| 6,751,658 | B1 * | 6/2004 | Haun et al. ............ 709/222 |
| 6,754,818 | B1 * | 6/2004 | Lee et al. .............. 713/2 |
| 6,848,034 | B1 * | 1/2005 | Cohn et al. ............. 711/153 |
| 6,895,480 | B1 * | 5/2005 | Heil .................... 711/153 |
| 6,898,705 | B1 * | 5/2005 | Abboud et al. .......... 713/100 |
| 6,904,482 | B1 * | 6/2005 | Rietze et al. ............ 710/107 |

OTHER PUBLICATIONS www.rlx.com, "Increased Processor Power." *RLX Server Blade 1000t*, RLX Technologies, Inc., Corporate Headquarters, 25231 Grogan's Mill Road, Suite 3000, The Woodlands, TX 77380-2174, (2002).
http://www.techweb.com/encyclopedia, "PXE," *TechEncyclopedia*, (Apr. 17, 2003).
http://www.techweb.com/encyclopedia, "blade server," *TechEncyclopedia*, (Apr. 11, 2003).
http://www.techweb.com/encyclopedia, "blade," *TechEncyclopedia*, (Apr. 11, 2003).

(Continued)

*Primary Examiner*—Thomas Lee
*Assistant Examiner*—Suresh K Suryawanshi
(74) *Attorney, Agent, or Firm*—Blakely, Sokoloff, Taylor & Zafman LLP (57) ABSTRACT

A method and system for repurposing a plurality of machines communicatively coupled together. A disk image is transferred to a first machine in the plurality of machines via a network. The disk image repurposes the first one of the plurality of machines to execute a new task. The disk image is then transferred from the first machine to a second machine in the plurality of machines. The first machine is boot on the disk image. The second machine is boot on the disk image received from the first machine.

27 Claims, 5 Drawing Sheets

OTHER PUBLICATIONS http://www.dmtf.org/standards, "Alert Standard Format (ASF) Specification," *DMTF distributed management task force, inc.*, (Apr. 11, 2003).

http://searchwindowsmanageability.techtarget.com, "PXE," searchWindowsManageability.com *Definitions*, (Apr. 17, 2003).

* cited by examiner

METHOD AND SYSTEM FOR RAPID REPURPOSING OF MACHINES IN A CLUSTERED, SCALE-OUT ENVIRONMENT

TECHNICAL FIELD

This disclosure relates generally to repurposing machines communicatively coupled together to execute new tasks, and in particular but not exclusively, relates to rapidly installing a new operating system and/or applications onto blades of a blade server to execute new tasks.

BACKGROUND INFORMATION

The Internet has become a popular medium for companies to advertise their products/services and promote their name. One popular trend is to provide a homepage on the World Wide Web that introduces a company and its products/services. In fact, this tends has become so popular that all types of companies, even non-technology related companies, are providing homepages.

A new industry has developed to support the needs of companies and/or individuals that either do not have the resources to host their own homepage or would simply prefer to hire another to manage their web site. This industry includes data hosting companies and web page hosting companies. These hosting companies can service a diverse collection of customers that come and go and expand and contract, often at astonishing rates. As such, the web servers physically hosting these databases/web pages must be capable to scale with the needs of the customer.

Blade servers are commonly employed to provide economic scalability. A blade is a thin, modular electronic circuit board, containing one or more microprocessors and memory that is intended for a single dedicated application, such as web page hosting. These blades can be easily inserted into a space-saving rack (called a blade server) containing many similar blades and communicatively coupled together via a common bus or other network. In fact, currently available blade servers have 280 or more individual blades mounted vertically in multiple rows within a single floor-standing cabinet.

Preparing an individual blade to perform a specific task, such as web page hosting is called "repurposing." One technique used to repurpose a blade is to boot the blade over a network from a boot server, thereby providing the blade with its new operating system and application files. A protocol called pre-boot execution environment ("PXE") is a wired for management capability that enables a PC to boot from a boot server over a network. Using the PXE protocols, the boot server individual repurposes each blade in a blade server.

There are several drawbacks of using a single boot server to repurpose each blade in a blade server or even multiple banks of blade servers. First, the point at which the boot server couples to the bus/network for transferring the disk images to the blades becomes a throughput bottleneck. The disk images transferred can be large files that consume considerable bandwidth to transfer in a timely manner. Second, the boot server itself is a single point of failure, with little or no fault-tolerant redundancy. If the boot server fails, the repurposing process is halted until the boot server is repaired or replaced. Finally, a boot server is not scalable. As the number of blades installed increases, the time to repurpose an entire blade server decreases. In fact, the efficiency of the boot server declines exponentially with the number of blades requiring repurposing.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method to rapidly repurpose machines communicatively coupled together are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. "Repurposing" is defined herein to be the act of providing a processing system with new software and/or firmware to enable the processing system to execute new tasks. Repurposing includes the acts of providing a new processing system (e.g., a naked hardware system newly delivered from the original equipment manufacturer ("OEM")) software/firmware for the first time, as well as, adding to or replacing existing software/firmware already installed on the processing system. The term "provisioning" is defined to have the same meaning as "repurposing" and maybe used interchangeably throughout this specification.

Figure 1:
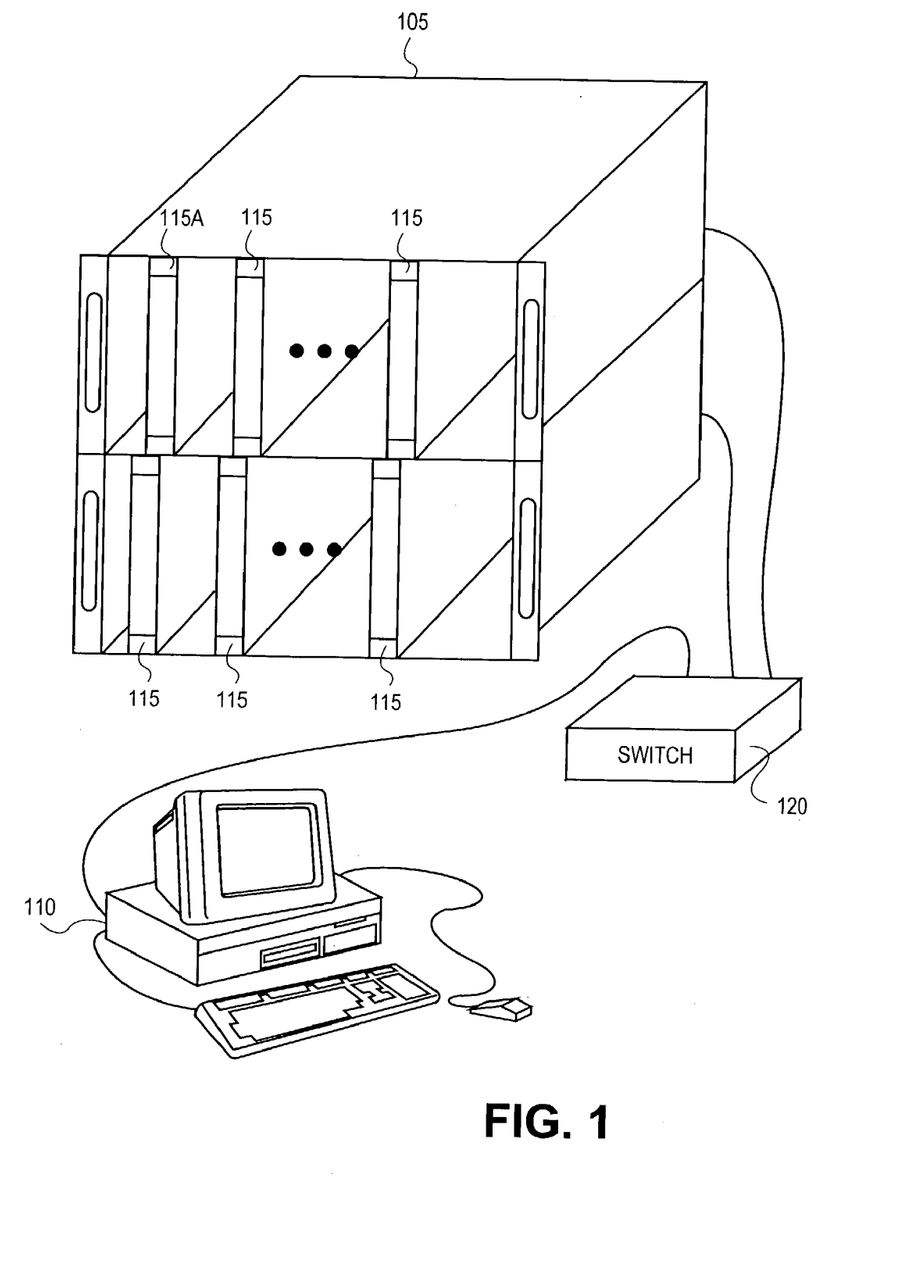
FIG. 1 is a perspective view illustrating a blade server and a boot server to implement a method of rapid repurposing of blades of the blade server, in accordance with an embodiment of the present invention.

FIG. 1 is a perspective view illustrating one embodiment of a blade server 105 and a boot server 110 to implement a method of rapid repurposing of blades 115 of blade server 105, in accordance with an embodiment of the present invention. In the illustrated embodiment, blade server 105 includes a plurality of blades 115 compactly mounted within a cabinet. In the illustrated embodiment, boot server 110 is represented by a personal computer ("PC"), though other types of processing systems may implement the functionality of boot server 110.

In one embodiment, blades 115 are communicatively coupled to each other and to boot server 110 via a switch 120. Switch 120 is illustrated as external to boot server 105 for the sake of clarity; however, other embodiments include switch 120 being internal to blade server 105. Furthermore, only one switch 120 is illustrated for simplicity, but any number of switches 120 may be used to interconnect the individual blades 115. Multiple switches may be configured to couple blades 105 in a multi-layered manner that logically groups blades 105 into a "root-like" structure. Although the illustrated embodiment depicts blades 105 coupled to switch 120 via cables, in one embodiment, an interface plane (not illustrated) including one or more communication buses interconnects blades 115. In one embodiment, switch 120 is replaced with an Ethernet hub. In one embodiment, one or more hubs and switches are used in combination to communicatively group blades 115 into the root-like structure. It should be appreciated that other known methods and configurations of communicatively coupling blades 115 and boot server 110 may be used and tailored to suit the desired environment and performance constraints.

Although the present invention is well suited for a blade server computing environment, it is equally applicable to and may be implemented with a local area network ("LAN") and/or a wide area network ("WAN") having a plurality of individual computers (e.g., personal computers, workstations, etc.) communicatively coupled together. However, for demonstrative purposes embodiments of the present invention will be described in connection with the blade server computing environment.

Figure 2:
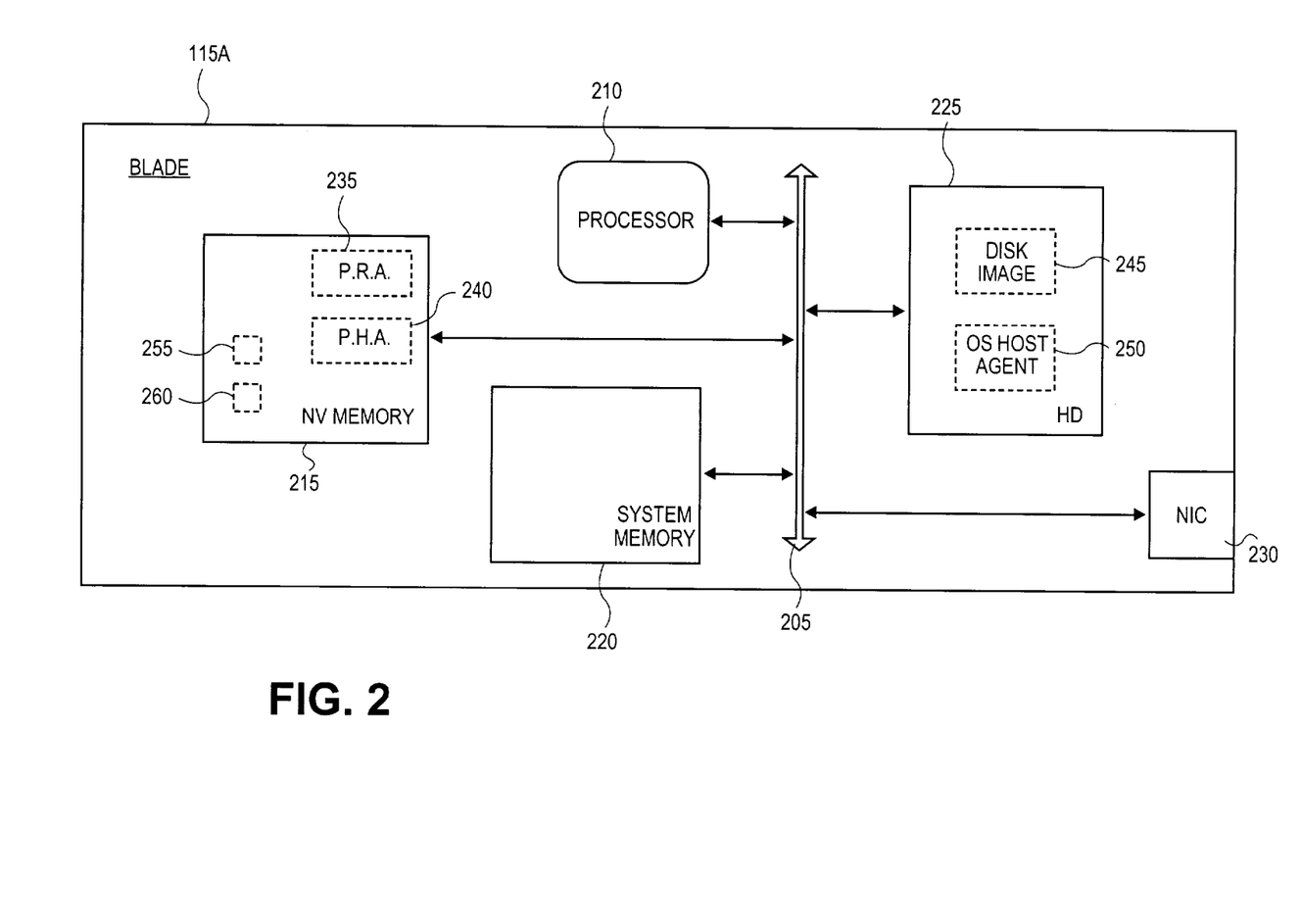
FIG. 2 is a block diagram illustrating a blade to implement a method of rapid repurposing, in accordance with an embodiment of the present invention.

FIG. 2 is a block diagram illustrating an individual blade 115A, in accordance with an embodiment of the present invention. In the illustrated embodiment, blade 115A includes a system bus 205, a processor 210, nonvolatile memory 215, system memory 220, a hard disk 225, and a network interface card ("NIC") 230.

The elements of one embodiment of blade 115A are interconnected as follows. Processor 210, system memory 220, NV memory 215, hard disk 225, and NIC 230 are all communicatively coupled to system bus 225. Processor 210 is capable of retrieving and executing software/firmware instructions stored in NV memory 215 (e.g., a pre-boot repurposing agent 235, a pre-boot host agent 240, etc.), system memory 220, and hard disk 225 (e.g., a disk image 245, an OS host agent 250). These elements operate in cooperation with each other as is generally known in the field. NIC 230 is communicatively coupled to switch 120 allowing blade 115A to send and to receive data to/from boot server 110 and other blades 115. It should be appreciated that various other elements of blade 115A have been excluded from FIG. 2 and this discussion for the purposes of clarity.

In one embodiment, NV memory 215 is flash memory. In other embodiments, NV memory 215 may include read only memory ("ROM"), programmable ROM, erasable programmable ROM, electrically erasable programmable ROM, or the like. In one embodiment, system memory 220 is system random access memory. It should be appreciated that other known or after arising technology for storing applications while being executed by a processor may implement the functionality of system memory 220, within the scope of the present invention. In one embodiment, hard disk 225 is an EIDE hard disk. In other embodiments, hard disk 225 may include an IDE hard disk, a SCSI hard disk, a tape drive, a CD-RW drive, a ZIP drive or other similar nonvolatile storage devices. It should be appreciated that various other known or future arising implementations of storing data may replace hard disk 225 for storing disk image 245 and OS host agent 250, within the scope of the present invention.

Figure 3:
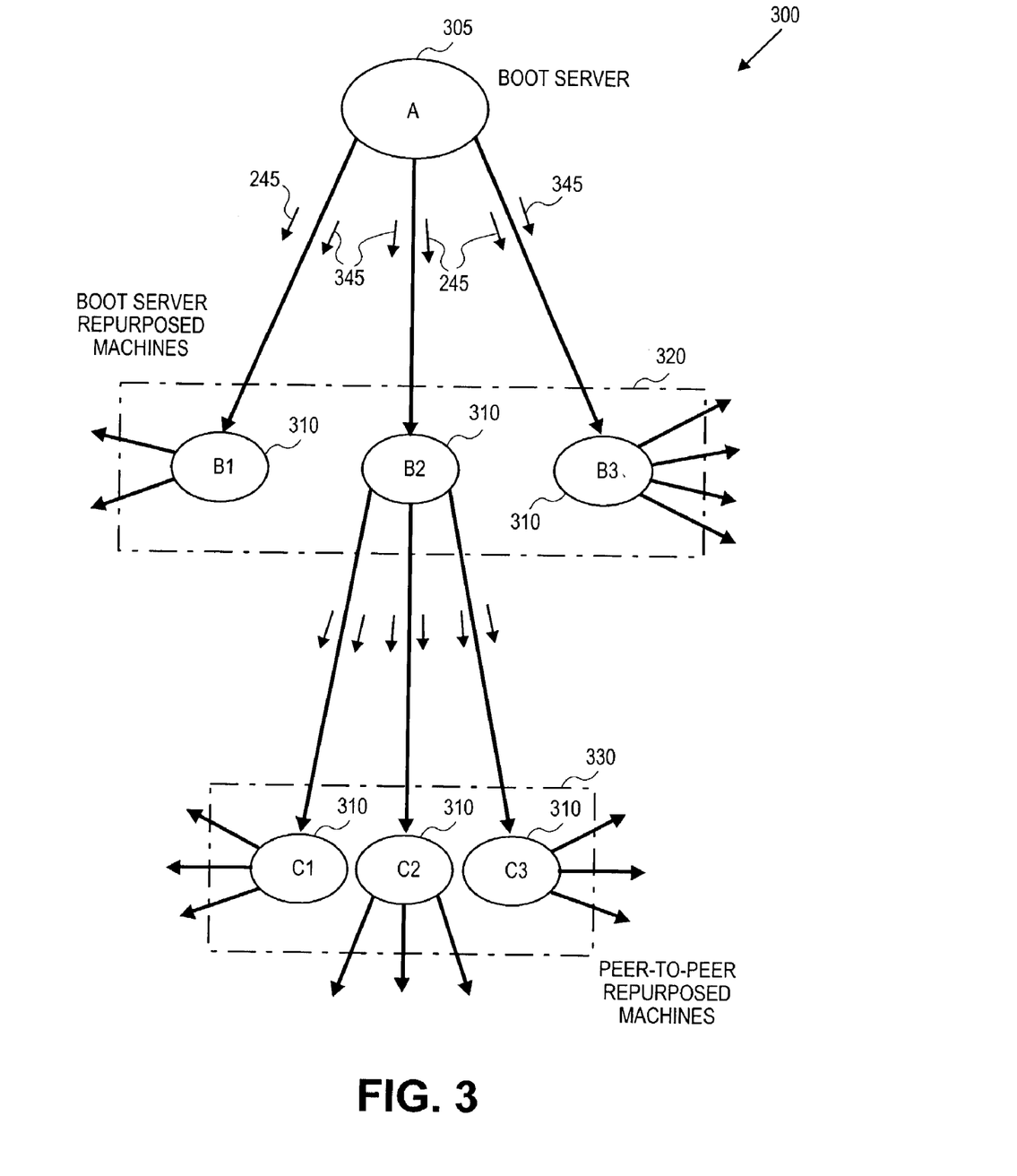
FIG. 3 is a block diagram illustrating a system of machines communicatively coupled together to implement rapid repurposing of the machines to execute new tasks, in accordance with an embodiment of the present invention.

FIG. 3 is a block diagram illustrating a system 300 for implementing rapid repurposing of machines 310, in accordance with an embodiment of the present invention. The illustrated embodiment of system 300 includes a boot server 305 and a plurality of machines 310 communicatively coupled together. Machines 310 are logically and communicatively grouped into a root-like structure for reasons discussed below. In one embodiment, boot server 305 is a block representation of boot server 110, illustrated in FIG. 1. In one embodiment, machines 310 are block representations of blades 115, illustrated in FIGS. 1 and 2. For the purposes of discussion, it will be assumed that machine B2 represents blade 115A, illustrated in FIG. 2.

Machines B1, B2, and B3 form a group 320 of machines 310. Machines C1, C2, and C3 form a group 330 of machines 310. Group 320 are repurposed by boot server 305 and therefore are client machines of boot server 305. Boot server 305 is in turn a host to group 320. Group 330 are repurposed by machine B2 and therefore are client machines of their host machine B2. The arrows illustrate individual host and client relationships between boot server 305 and machines B1, B2, and B3, or between the various machines 310 themselves. Thus, each of machines 310 are capable of being provisioned with software/firmware by a host and further capable of provisioning one or more clients with the same software/firmware they received from their host.

The arrows further represent the flow of data. In other words, boot server 305 repurposes each of machines B1, B2, and B3 by provisioning them with disk image 245 and provisioning data 345. In one embodiment, disk image 245 and provisioning data 345 are directed to one or more of machines 310 using a unique identifier identifying the targeted machine(s) (e.g., IP address, MAC address, GUID, or the like). In one embodiment, disk image 245 and provisioning data 345 are directed towards the targeted one or more of machines 310 by configuring switch 120 to direct disk image 245 and provisioning data 345 to the targeted machine 310. In yet another embodiment, both switch 120 and the unique identifier are used in conjunction to direct disk image 245 and provisioning data 345 to the targeted machine 310.

It should be appreciated that by using switch 120 and/or unique identifiers to direct disk images 245 and provisioning data 345 directly to the targeted machine 310, the time to repurpose all machines 310 is minimized. Repurposing time is minimized due to efficient use of the bandwidth coupling machines 310 and the exponential growth of machines 310 acting as hosts to their corresponding client machines.

Although FIG. 3 illustrates only a three level root-like structure, any number of levels may be implemented in practice. Similarly, FIG. 3 illustrates each level of machines 310 (e.g., groups 320 and 330) as having only three machines 310 for the sake of discussion. However, any number of machines 310 may comprise a group and all groups need not have the same number of machine 310 therein. Thus, machine B1 may repurpose only two client machines, while machine B3 may repurpose four client machines. Additionally, the actual grouping of machines 310 may dynamically change from one repurposing to the next. In other words, machine B2 may be the host to machines C1, C2, and C3 in a current repurposing, but only be the host to machine C1 in a future repurposing.

Figure 4:
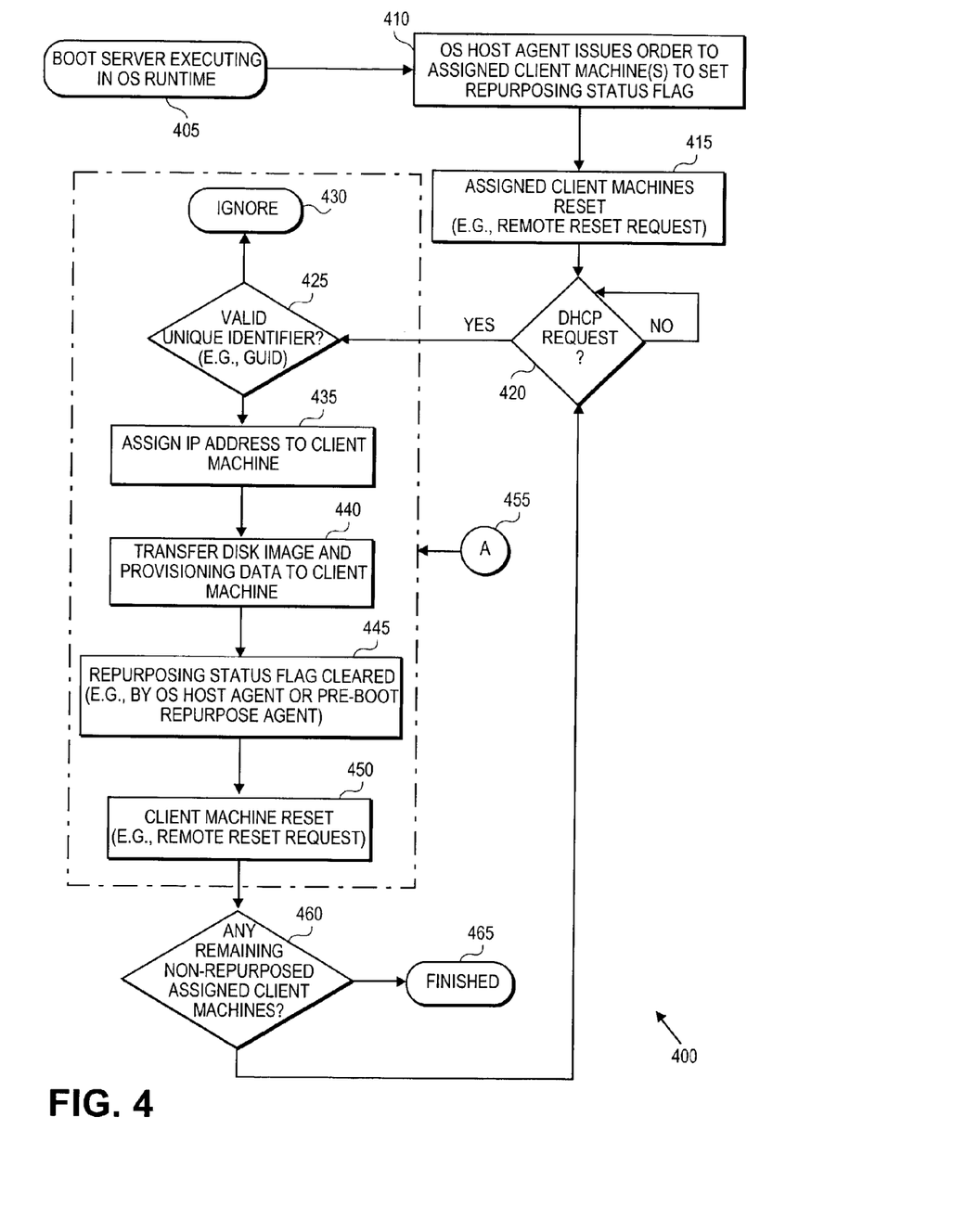
FIG. 4 is a flow chart illustrating a process a boot server executes to implement rapid repurposing of machines communicatively coupled to the boot server, in accordance with an embodiment of the present invention.

FIG. 4 is a flow chart illustrating a process 400 that one embodiment of boot server 305 executes to implement rapid repurposing of machines B1, B2, and B3, in accordance with an embodiment of the present invention.

In a process block 405, boot server 305 is executing software instructions in an operating system ("OS") runtime. In one embodiment, boot server 305 is running a Microsoft Windows™ OS (e.g., 95, 98, NT, ME, 2000, XP, etc.) during OS runtime; however, other operating systems may be used in accordance with other embodiments of the present invention, including UNIX (e.g., Solaris, Linux, etc.), Macintosh OS, IBM OS, or the like.

In a process block 410, boot server 305 prepares machines 310 assigned to boot server 305 for repurposing. Referring to the illustrated embodiment of system 300 in FIG. 3, machines B1, B2, and B3 of group 320 are those machines 310 assigned to boot server 305. An OS host agent executing on boot server 305 issues a command to machines 310 of group 320 to set their respective repurposing status flags. In the embodiments where machines 310 represent blades 115 and machine B2 represents blade 115A (see FIG. 2), blade 115A would set repurposing status flag 255. Repurposing status flag 255 indicates to blade 115A that blade 115A should prepare to receive a new disk image. In one embodiment, repurposing status flag 255 is a variable in NV memory 215. In alternative embodiments, repurposing status flag 255 can be a variable stored on hard disk 225 or other nonvolatile storage devices of blade 115A (not shown), in a known address location.

In a process block 415, machines 310 of group 320 reset and enter a pre-boot runtime. In one embodiment, machines 310 of group 320 reset after receiving a remote reset request from boot server 305. One example remote reset request is that defined by the Alert Standard Format ("ASF") Specification, v1.03, Jun. 2, 2001 by Distributed Management Task Force, Inc. In one embodiment, setting repurposing status flag 255 automatically triggers machines 310 of group 320 to reset into the pre-boot runtime. Once reset into the pre-boot runtime, machines 310 of group 320 begin to broadcast dynamic host configuration protocol ("DHCP") requests for internet protocol ("IP") addresses to boot server 305.

In a decision block 420, boot server 405 receives one or more DHCP IP address requests. In one embodiment, the DHCP IP address requests are serviced on a first come first serve basis. For the sake of discussion, it is assumed that machine B2 is serviced first. In a decision block 425, boot server 305 authenticates machine B2 based on a unique identifier of machine B2. In one embodiment, the unique identifier is a media access control ("MAC") address of machine B2. In the embodiment of blade 115A, the unique identifier can be the MAC address of NIC 230. In one embodiment, the unique identifier is a global unique identifier ("GUID"). Authenticating machine B2 in process block 425 not only provides a layer of security to prevent the wrong machine 310 from receiving potentially sensitive information not intended for it, but also allows boot server 305 to distribute different software/firmware to different machines 310. For example, boot server 310 may have a table correlating unique identifiers identifying each of machines 310 with different software/firmware to be transferred to each of machines 310.

Additionally, depending upon how machines 310 are networked together, boot server 305 may receive DHCP IP requests broadcast by machines 310 not a part of group 320. In this case, boot server 305 would determine by way of the unique identifier not to respond to the DHCP IP request, because another machine 310 has been assigned host status to the machine 310 requesting an IP address. When boot server 305 receives a request for an IP address from one of machines 310 having an invalid unique identifier, process 400 continues to a process block 430, where boot server 305 ignores the request for an IP address.

In a process block 435, boot server 305 assigns machine B2 an IP address, if the unique identifier of machine B2 is authenticated in decision block 425. Assigning an IP address to machine B2 establishes the ability for boot server 305 to communicate with machine B2 and transfer software/firmware thereto.

In a process block 440, boot server 305 transfers disk image 245 and provisioning data 345 to machine B2. In this case, blade 115A receives disk image 245 from boot server 305 via NIC 230 and stores disk image 245 to hard disk 225. In one embodiment, disk image 245 may be the first disk image received by blade 115A and therefore constitutes a first time repurposing of blade 115A. In one embodiment, blade 115A has previously been repurposed, therefore disk image 245 either adds software to a previously installed disk image on hard disk 225 or overwrites the old disk image, thereby providing blade 115A with replacement/update software. In one embodiment, disk image 245 is an entirely new OS and new application software. For example, the old disk image of blade 115A may have been software to host a database for company X. Newly received disk image 225 may be software to host web pages for company Y.

Provisioning data 345 transferred from boot server 305 to machine B2 is data to facilitate machine B2 to become a host to machines 310 of group 330, discussed in further detail below. In one embodiment, provisioning data 345 includes the table of unique identifiers correlating data images with unique identifiers. In one embodiment, the table may further include information indicating which of machines 310 is to act as a host to other machines 310. For example, the table may indicate to machine B2 that once machine B2 is repurposed by boot server 305, it is to repurpose machines C1, C2, and C3 on a peer-to-peer basis.

In a process block 445, repurposing status flag 255 is cleared. In one embodiment, pre-boot repurposing agent 235 executing on blade 115A clears repurposing status flag 255 after disk image 245 and provisioning data 345 are stored to hard disk 225. In one embodiment, the OS host agent executing on boot server 305 remotely clears repurposing status flag 255. Once repurposing status flag 255 is cleared, machine B2 resets (process block 450). Machine B2 resets under the control of pre-boot repurposing agent 235 or via a remote reset request sent from boot server 305.

In a decision block 460, boot server 305 determines whether all machines 310 of group 320 have been repurposed. In one embodiment, boot server 305 can make this determination with reference to the table of unique identifiers. Each time a machine 310 is repurposed, boot server 305 updates the table to indicate the status of the particular machine 310 as repurposed. If the table indicates that other machines 310 assigned to boot server 305 have not yet been repurposed (e.g., machine B1 and B3), then process 400 returns to decision block 420 where boot server 310 processes the next DHCP request. Once all machines 310 assigned to boot server 305 (e.g., machines B1, B2, and B3) are repurposed, process 400 continues to a process block 465 indicating that boot server 305 has completed its role in repurposing machines 310.

Figure 5:
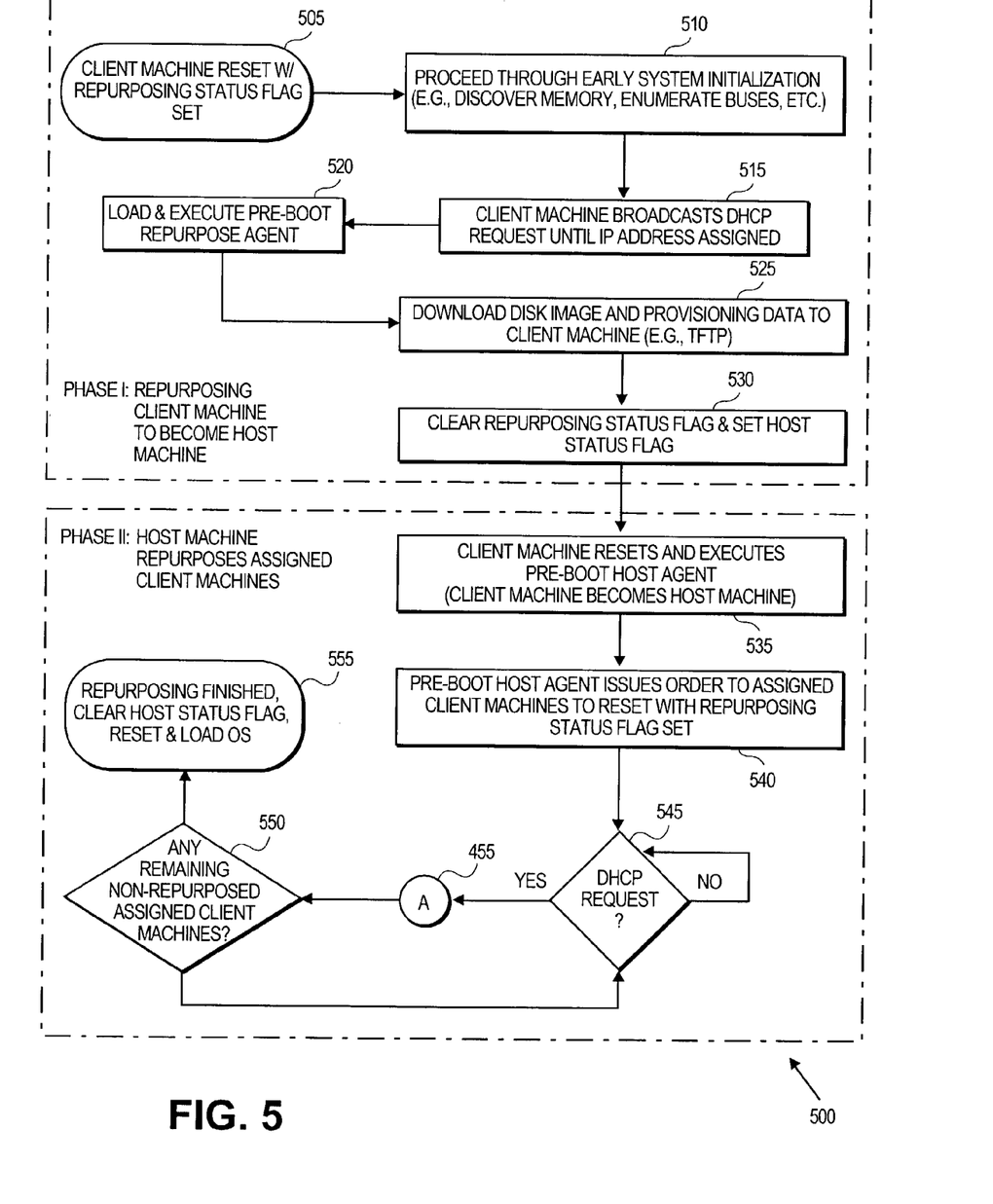
FIG. 5 is a flow chart illustrating a process a client machine executes to implement rapid repurposing of itself and other client machines communicatively coupled to the client machine, in accordance with an embodiment of the present invention.

FIG. 5 is a flow chart illustrating a process 500 that one embodiment of a machine 310 executes to implement rapid repurposing of itself and its client machines 310, in accordance with an embodiment of the present invention. For the sake of discussion, process 500 will be discussed in connection with machine B2 and blade 115A. However, it should be appreciated that process 500 is equally applicable to any of machines 310 and processing systems other than blades.

In a process block 505, machine B2 is reset with repurposing status flag 255 set, as discussed above in connection with process blocks 410 and 415. In a process block 510, machine B2 proceeds through early system initialization during the pre-boot runtime. In one embodiment, early system initialization includes such tasks as discovery of system memory 220, enumeration of bus 205, and the like.

In a process block 515, while machine B2 is still executing in the pre-boot runtime, machine B2 broadcasts a DHCP request for an IP address to boot server 305. Machine B2 continues broadcasting the DHCP request for an IP address until boot server 305 furnishes machine B2 with an IP address.

Once machine B2 obtains an IP address, process 500 continues to a process block 520, where machine B2 (which represents blade 115A in one embodiment) loads pre-boot repurposing agent 235. In one embodiment, pre-boot repurposing agent 235 is a firmware application stored in NV memory 215, loaded into system memory 220, and executed by processor 210 therefrom. In one embodiment, pre-boot repurposing agent 235 is an extensible firmware interface ("EFI") application compliant with the EFI Specification, v1.10, Dec. 1, 2002, developed by Intel Corporation.

In a process block 525, machine B2, under the control of pre-boot repurposing agent 235, downloads disk image 245 and provisioning data 345 from boot server 305. Disk image 245 is downloaded directly to hard disk 225 where it is stored. In one embodiment, provisioning data 345 is also transferred to and stored on hard disk 225. In one embodiment, provisioning data 345 is transferred to and stored in NV memory 215. In yet another embodiment, provisioning data 345 is a portion of disk image 245, which is subsequently parsed by pre-boot host agent 240 or OS host agent 250, discussed in further detail below. In one embodiment, disk image 245 and provisioning data 345 are transferred from boot server 305 to machine B2 using a member service of a pre-boot execution environment ("PXE") called trivial file transfer protocol ("TFTP").

Once disk image 245 and provisioning data 345 are transferred to machine B2, repurposing status flag 255 is cleared and a host status flag 260 is set (process block 530). In one embodiment host status flag 260 is a variable in NV memory 215. In one embodiment, pre-boot repurposing agent 235 clears repurposing status flag 255 and sets host status flag 260. In an alternative embodiment, the OS host agent executing on boot server 305 clears repurposing status flag 255 and sets host status flag 260.

With the completion of process block 530, the repurposing of machine B2 is complete and therefore a phase I of process 500 to repurpose machine B2 and to enable machine B2 to become a host to other machines 310 is complete. A phase II of process 500 includes the peer-to-peer repurposing of client machines by the newly created host machine.

In a process block 535, machine B2 resets into a new pre-boot runtime, either at the direction of pre-boot repurposing agent 235 or at the direction of boot server 305 (e.g., remote reset request). In one embodiment, because repurposing status flag 255 is cleared and host status flag is set, machine B2 will not load and execute pre-boot repurposing agent 235; rather, machine B2 loads and executes a host agent.

In one embodiment, machine B2 loads and executes pre-boot host agent 240 stored in NV memory 215. In an alternative embodiment, machine B2 proceeds through pre-boot runtime system initialization, loads the OS received in disk image 245, and loads and executes OS host agent 250 (not shown in FIG. 5). Both pre-boot host agent 240 and OS host agent 250 perform the same basic tasks of repurposing client machines; however, pre-boot host agent 240 is a pre-boot runtime application where as OS host agent 250 is an OS runtime application. Pre-boot host agent 240 has the advantage of being OS independent. In other words, pre-boot host agent 240 works to repurpose client machines independent of the actual data transferred in disk image 245, whether it is a Window based OS, a Linux based OS, or some other OS and associated applications. In contrast, OS host agent 250 executes in the OS runtime and therefore must be compliant with the OS in which it is executing.

In a process block 540, pre-boot host agent 240 (or OS host agent 250), executing on machine B2, issues a request to machines C1, C2, and C3 (group 330) to set their repurposing status flags and reset. In one embodiment, machine B2 determines to repurpose machines 310 of group 330 with reference to provisioning data 345 received from boot server 305. In one embodiment, provisioning data 345 includes a table of unique identifiers of machines 310 of group 330. This table indicates to machine B2 which machines 310 to repurpose. In one embodiment, this table further indicates to machine B2 to repurpose machines 310 of group 330 with the same disk image 245 machine B2 received from boot server 305. In an alternative embodiment, this table may indicate to machine B2 to repurpose machines 310 or group 330 with only a portion of disk image 245. Thus, in the alternative embodiment, disk image 245 may have contained a first portion intended for use by machine B2 and a second portion intended for use by machines 310 of group 330.

Once machine B2 issues the set repurposing status flag and reset request, machine B2 waits in a decision block 545 to receive DHCP requests for an IP address from machines 310 of group 330. As discussed above, in one embodiment, machine B2 services these requests on a first come first server bases.

A block 455 represents process blocks 430, 435, 440, 445, 450, and decision block 425, as discussed in connection with FIG. 4. Thus, in one embodiment, machine B2 proceeds through block 455 in a similar manner as discussed above. In a decision block 550, machine B2 determines whether any machines 310 of group 330 remain non-repurposed. If so, process 500 returns to decision block 545 and proceeds as discussed above. If not, machine B2 has completed repurposing its assigned client machines (group 330). Once complete, pre-boot host agent 240 clears host status flag 260 and resets machine B2. Upon resetting, machine B2 proceeds through early system initialization in the pre-boot runtime, and since neither repurposing status flag 255 nor host status flag 260 are set, machine B2 enter the OS runtime mode of operation by loading and executing the OS and associated applications received in disk image 245.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for repurposing a plurality of machines communicatively coupled together, comprising:
   transferring a disk image to a first one of the plurality of machines via a network, the disk image to repurpose the first one of the plurality of machines to execute a new task;
   transferring the disk image from the first one of the plurality of machines to a second one of the plurality of machines via the network during a pre-boot runtime of the first one of the plurality of machines, the transferring of the disk image from the first one of the plurality of machines to the second one of the plurality of machines initiated by a software agent;
   booting the first one of the plurality of machines based on the disk image; and
   booting the second one of the plurality of machines based on the disk image received from the first one of the plurality of machines.

2. The method of claim 1, further comprising:
   transferring the disk image to a first set of machines from among the plurality of machines via the network;
   transferring the disk image from each of the first set of machines to corresponding second sets of machines from among the plurality of machines.
   booting each one of the first set of machines based on the disk image; and
   booting each one of the second sets machines based on the disk image.

3. The method of claim 1 wherein the software agent comprises code compliant with an extensible firmware interface ("EFI") stored in a nonvolatile memory unit.

4. The method of claim 1 wherein the disk image includes an operating system to boot the machines and application files to execute thereon.

5. The method of claim 1, further comprising transferring provisioning data to the first one of the plurality of machines, the provisioning data to indicate to which of the plurality of machines the first one of the plurality of machines is to transfer the disk image.

6. The method of claim 5 wherein the provisioning data includes a table of unique identifiers identifying one or more of the plurality of machines.

7. The method of claim 5 wherein the disk image includes the provisioning data.

8. The method of claim 1, further comprising authenticating the first one of the plurality of machines prior to transferring the disk image to the first one of the plurality of machines and authenticating the second one of the plurality of machines prior to transferring the disk image to the second one of the plurality of machines.

9. The method of claim 1 wherein the plurality of machines collectively comprise a blade server and each machine comprises a blade.

10. The method of claim 1 wherein the disk image is transferred to the first one of the plurality of machines via the network from a boot server, the boot server executing instructions in an operating system runtime.

11. An article of manufacture comprising a machine-accessible medium having stored thereon instructions that, when executed by a machine, cause the machine to:
    download a disk image from a boot server via a network, the disk image to repurpose the machine to execute a new task;
    download provisioning data from the boot server indicating at least one other machine coupled to the network to which the machine is to transfer the disk image;
    transfer the disk image received via the network to the at least one other machine indicated by the provisioning data to repurpose the at least one other machine to execute the new task;
    boot off the disk image; and
    execute the new task.

12. The machine-accessible medium of claim 11 having stored thereon, further instructions, that when executed by the machine, cause the machine to transfer the disk image received via the network to a plurality of other machines coupled to the network.

13. The machine-accessible medium of claim 11 wherein the instructions cause the machine to download the disk image from the boot server and to transfer the disk image to the other machine during a pre-boot runtime of the machine.

14. The machine-accessible medium of claim 12 wherein the provisioning data includes a table of unique identifiers identifying the other machine and the plurality of other machines, the table indicating to transfer the disk image to the other machine and to the plurality of other machines.

15. The machine-accessible medium of claim 14 wherein the unique identifiers are global unique identifiers ("GUIDs").

16. The machine-accessible medium of claim 12 wherein the provisioning data indicates to the machine how to configure switching devices in the network to direct the disk image to the other machine and the plurality of other machines.

17. The machine-accessible medium of claim 11 wherein the disk image includes an operating system and application files, the operating system and the application files to cause the machine to execute the new task.

18. The machine-accessible medium of claim 12 wherein the disk image includes the provisioning data.

19. A blade server, comprising:
    a plurality of blades communicatively coupled, each blade of the plurality of blades including a nonvolatile memory unit having instructions stored therein,
    wherein the instructions of a first one of the plurality of blades, when executed by the first one of the plurality of blades, enable the first one of the plurality of blades to:
      receive a disk image via a network during a pre-boot runtime of the first one of the plurality of blades, the disk image to repurpose the first one of the plurality of blades to execute new tasks; and
      transfer the disk image to a second one of the plurality of blades to repurpose the second one of the plurality of blades to execute the new tasks.

20. The blade server of claim 19 wherein the instructions of the first one of the plurality of blades further to enable the first one of the plurality of blades to transfer the disk image to a first set of blades from among the plurality of blades to repurpose the first set of blades to execute the new tasks, the first set of blades including the second one of the plurality of blades.

21. The blade server of claim 20 wherein the instructions of the first set of blades enable each of the first set of blades to:
   receive the disk image from the first one of the plurality of blades, the disk image to repurpose the receiving blade to execute new tasks; and
   transfer the disk image to a corresponding second set of blades from among the plurality of blades to repurpose each of the second set of blades to execute the new tasks.

22. The blade server of claim 20 wherein the disk image is automatically transferred to the first set of blades in response to receiving the disk image.

23. The blade server of claim 22, further comprising a switch communicatively coupled between the first one of the plurality of blades and the first set of blades, the first set of blades selectable to transfer the disk image to by selectively configuring the switch.

24. The blade server of claim 22 wherein the first set of blades to be selected with reference to a table of unique identifiers identifying each of the blades in the first set of blades.

25. The blade server of claim 24 wherein the instructions of the first one of the plurality of blades further to download provisioning data via the network, the provisioning data including the table of unique identifiers.

26. The blade server of claim 24 wherein the unique identifiers comprise globally unique identifiers ("GUIDs") corresponding to one or more of the plurality of blades.

27. The blade server of claim 25 wherein the disk image includes the provisioning data.

* * * * *